Nov. 27, 1945.  T. J. LEHANE ET AL  2,389,860
TEMPERATURE CONTROL BY OVERHEAD VENTILATION
Filed Jan. 19, 1942  2 Sheets-Sheet 1
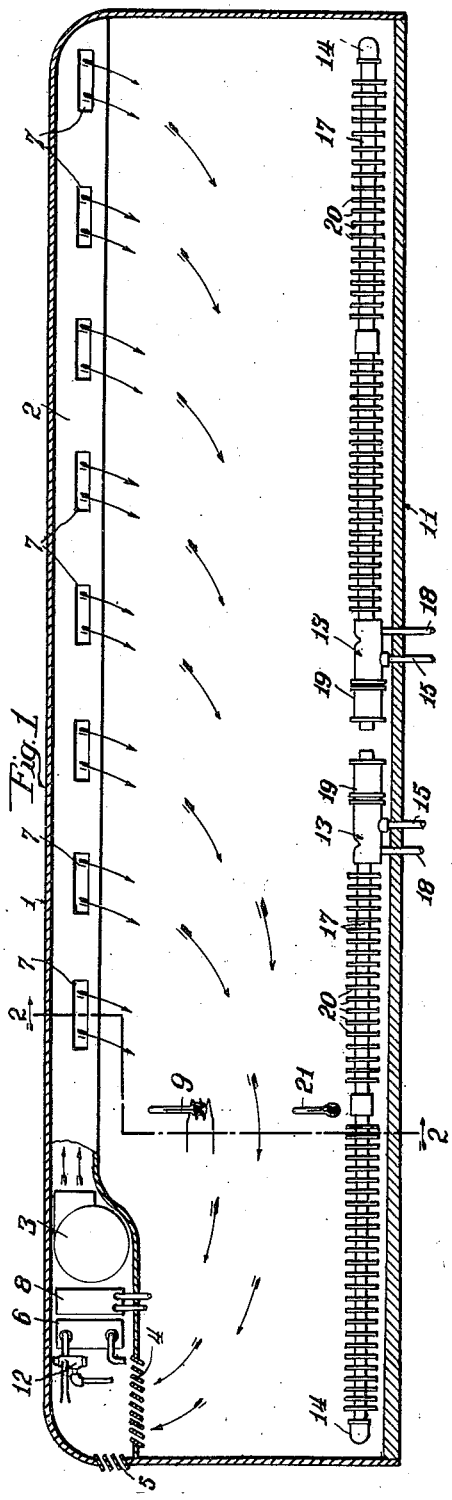
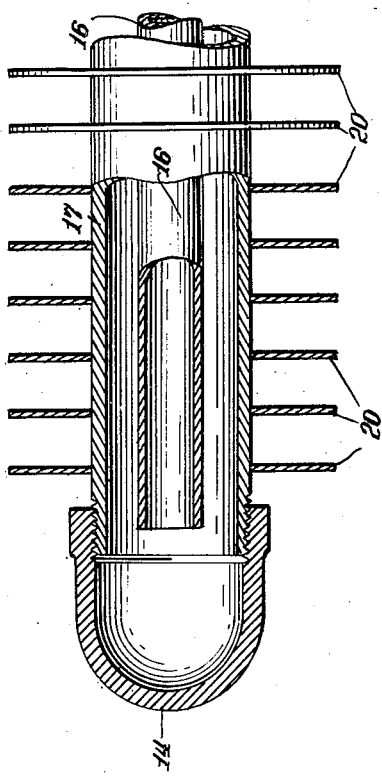
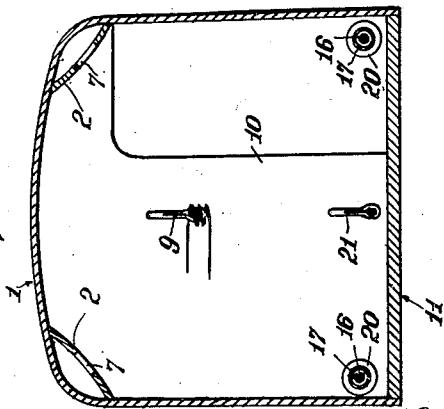
Inventors
Timothy J. Lehane
and Everett H. Burgess
By Barnett a Truman
Attorneys.

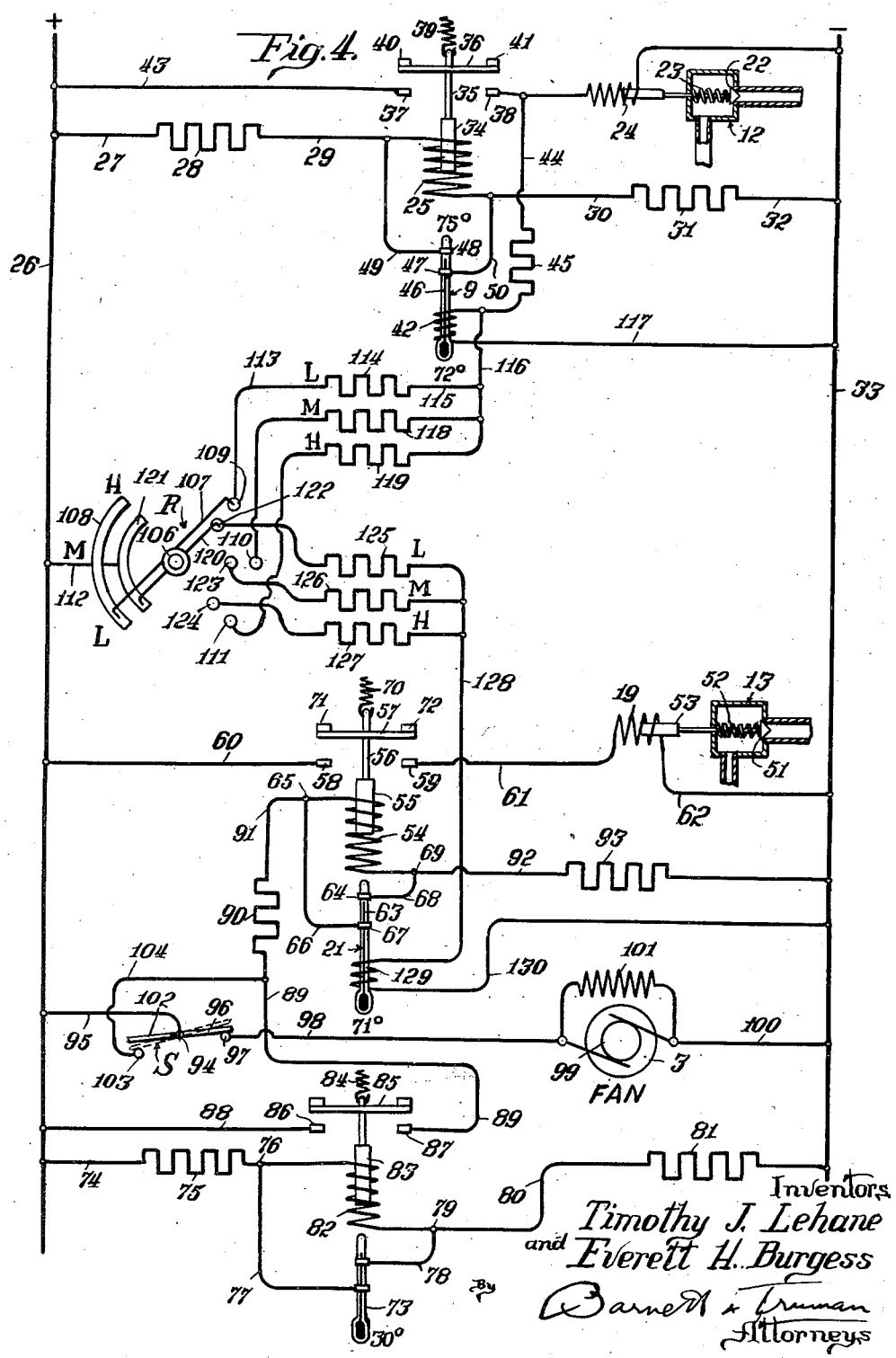

Patented Nov. 27, 1945

2,389,860

UNITED STATES PATENT OFFICE 2,389,860

TEMPERATURE CONTROL BY OVERHEAD VENTILATION

Timothy J. Lehane and Everett H. Burgess, Chicago, Ill., assignors to Vapor Car Heating Company, Inc., Chicago, Ill., a corporation of New York Application January 19, 1942, Serial No. 427,257

2 Claims. (Cl. 236—91)

This invention relates to a system for simultaneously ventilating and controlling the temperature within a railway car, or similar enclosure, by means of a circulating air stream. Under reasonably normal weather conditions sufficient heat can be added to this air stream to keep the interior of the car at the requisite temperature, and since a certain proportion of outside air is continuously added to the air stream, a certain amount of cooling is accomplished by this air stream when heat is not added. A "floor-heat" system is also provided for adding additional heat directly to the air within the car when because of extremely cold outside weather conditions the ventilating system is no longer capable of maintaining the car interior sufficiently warm.

Briefly described, this system comprises an overhead duct or ducts through which an air stream is propelled by a fan or blower and discharged downwardly into the upper portion of the car. A certain amount of re-circulated air is drawn into one portion of the duct and mixed with a smaller proportion of fresh air from outside the car to form the air stream which flows in contact with a heating means within the duct and thence is projected into the car. The heater is controlled by means comprising a thermostat positioned at an intermediate location within the car, preferably at a height of about five feet above the floor and in the path of the air flowing through the car toward the exit into the duct. When the maximum amount of heat is being added by this heater in the duct, the air within the car at the level of the thermostat will usually be maintained approximately at a predetermined temperature, but as the temperature at this location rises the heat from the heater will be decreased until no heat will be added at or above a predetermined maximum temperature. Since a certain proportion of cold or fresh air is continuously being added to the air stream, this overhead system will function as a cooling means above this maximum temperature.

A radiator or plurality of radiators are positioned near the floor level usually adjacent the side walls of the car, and this floor-radiation is controlled by a thermostat positioned so as to respond to changes in the temperature of the air strata adjacent the floor. When the temperature at this lower level falls below a predetermined minimum (usually slightly below the minimum temperature to be maintained by the circulating air stream) heating medium will be admitted to the floor-radiation and thus the lower strata of air within the car will be directly heated, this heated air rising toward the roof so as to eventually aid in heating the upper portion of the car. The two heating systems will thereafter cooperate, in the novel manner hereinafter described in detail, so as to maintain a desired substantially constant temperature within the car, which is simultaneously ventilated to the necessary extent. It should be understood that the floor-heat system is normally in the nature of an auxiliary heating means, the heating as well as the ventilating (and sometimes sufficient cooling) being normally accomplished by the circulating air system. Preferably means are provided whereby the floor heat radiation cannot be put in service unless the air-circulating means is inoperative, or until the outside air temperature falls below a predetermined minimum.

The principal object of this invention is to provide an improved car heating and ventilating system as briefly described hereinabove and disclosed more in detail in the specification which follows.

Another object is to provide a car heating system comprising cooperating systems for supplying "over-head" and "floor" heat to the car as conditions necessitate.

Another object is to provide an improved system for controlling the heat of an over-head air stream in accordance with temperature changes at an intermediate location within the body of the car.

Another object is to provide improved means for controlling the heat added within the car at or adjacent the floor level.

Other objects and advantages of this invention will be more apparent from the following detailed description of certain approved apparatus designed to carry out the principles of this invention.

In the accompanying drawings:

Fig. 1 is a longitudinal vertical section through a railway car, showing rather diagrammatically certain features of the heating and ventilating system.

Fig. 2 is a transverse vertical section taken substantially on the line 2—2 of Fig. 1.

Fig. 3 is an enlarged detail view, partially in central vertical section, through one end of one of the floor-radiators.

Fig. 4 is a wiring diagram of the thermostatic operating means for the heating devices.

Referring first to Figs. 1 and 2, at 1 is indicated the confining wall structure of a railway car, in the upper portion of which, adjacent the roof, is formed a duct or ducts 2, through which an air stream is propelled by the fan or blower 3. Air to be re-circulated is drawn into the left hand (Fig. 1) end portion of the duct 2, through the inlet 4, and outside air is drawn in through the inlet 5. Preferably about 75% of the air stream will be re-circulated air drawn in through inlet 4 from the interior of the car, whereas about 25% of the air stream will be fresh air drawn in through inlet 5. This air stream will flow in contact with a heater 6 (usually a steam radiator) which, when operating, raises the temperature of the air stream which is projected into the interior of the car through the plurality of outlets 7 arranged at intervals throughout the length of the duct.

It will be understood that a cooler 8 may also be positioned in the left hand portion of the duct, for use when required, but for present purposes this cooler and its functioning will be ignored.

A thermostat 9 is supported at an intermediate location within the car, preferably in the path of the air stream flowing through the car from the duct-outlets 7 toward the duct-inlet 4. As indicated in Fig. 2, this thermostat may be supported on an interior partition 10 or its equivalent so that the thermostat will be located approximately at a height of five feet above the floor 11. The thermostat 9, through suitable electrical connections, causes the steam-inlet valve 12 to open and close, thus controlling the supply of steam to the radiator or heater 6. Although the heat is directly added to the air stream in duct 2, which air stream will normally be at a higher temperature than the air within the main portion of the car, the temperature of the heater 6 and the air stream will be controlled by variations in the temperature at the location of thermostat 9 within the car. This control will be described in detail hereinbelow.

A "floor-heat" system is provided in the lower portion of the car comprising a plurality of radiators mounted adjacent the side walls near the floor. Preferably each of these radiators is of the inner-tube type having a control valve 13 at one end and closed at the other end by a suitable cap 14. Steam flows into the radiator from the source of supply through an inlet pipe 15 (Fig. 1) thence through an inner pipe 16 to the other end of the radiator where the outer pipe 17 is closed by the cap 14, the steam and condensate flowing back through the outer pipe 17 and the condensate being discharged through the pipe 18, at the valve. The valve is opened and closed by mechanism adjacent the valve, as shown at 19, including an electrically operated solenoid, hereinafter referred to in connection with the wiring diagram. The outer pipe 17 is provided with a plurality of fins 20 forming extended surface radiation. Since the heat emission will ordinarily be greater near the closed end 14 of the radiator, two of these radiators have been shown in the present example adjacent one side of the car with the closed radiator ends 14 near the ends of the car where heat is most required, and the valved ends of the radiators adjacent one another at the center of the car. The exact number of radiators used and the arrangement thereof is optional. This floor-radiation is controlled by a thermostat 21 positioned near the floor of the car so as to respond to the temperature prevailing in the lower strata of air within the car.

It may be stated at this time that this floor-heat radiation is, in this system, employed as an auxiliary heating means which only functions under sub-normal or adverse weather conditions when the over-head heating system first described is unable to keep the car temperature up to the desired level.

Referring now to the upper portion of Fig. 4, the valve 12 for controlling the admission of stam to the heater 6 within the duct 2, comprises a movable valve member 22 which is moved to the closed position as shown by the spring 23. When the solenoid 24 is energized, this valve will be opened against the opposition of the spring.

The relay coil 25 would normally be energized by a current flowing from the main 26 through wire 27, resistor 28, wire 29, coil 25, wire 30, resistor 31 and wire 32 to the other main 33. When coil 25 is so energized it will pull down the core 34 and through stem 35 will lower the contact plate 36 into engagement with a lower pair of contacts 37 and 38. When the relay coil is not energized, the spring 39 will lift the stem 35 and core 34 so as to bring contact plate 36 into engagement with an upper pair of contacts 40 and 41, this being the position shown in the drawings. The thermostat 9 (which has already been described as located in the body of the car at the five foot level) is of the "cycling" type, being provided with a heating coil 42 which, when energized, adds about 3° to the atmospheric temperature to which the thermostat responds. This heater 42 may be energized through the following circuit: from main 26, through wire 43, relay contacts 37, 36 and 38, wire 44, resistor 45, heater 42, and thence through wire 117 to the other main 33.

When the heater 42 is not energized, the thermostat 9 will function at a predetermined temperature (for example 75°) since the mercury column 46 which is always in engagement with the lower contact 47 will at 75° engage the upper contact 48. However, when the heater 42 is energized so as to add 3° of heat to the thermostat, this thermostat will actually function at an atmospheric temperature of 72°. The contact 48 of the thermostat is connected by wire 49 with wire 29 and the lower contact 47 is connected by wire 50 with the wire 30 so that when a circuit is completed through the mercury column the relay coil 25 will be short-circuited, thus permitting the contact 36 to be elevated to the position shown in Fig. 4. Consequently the valve-operating solenoid 24 will not be energized and the valve 12 will be closed so that no steam will be flowing into the heater 6 within the air-duct.

Assuming now that the temperature within the car at the location of thermostat 9 is below 72°, the valve 12 will be continuously open and the heater 6 continuously supplied with steam, that is operating at its full capacity. This will follow since the thermostat 9 will not function since the mercury column 46 will never reach the upper contact 48 (even though the heater 42 is now effective) and the relay 25 will not be short-circuited and contact 36 will be continuously pulled down to complete the energizing circuit for valve-operating solenoid 24.

Now assuming that the temperature adjacent thermostat 9 rises to 72° or above, but not higher than 75° (for example to 72½°), the cycle of events will be as follows: The contact 36 being pulled down and the valve 12 open, steam is being supplied to the heater 6 to raise the temperature, and the auxiliary heater 42 is operative. The car temperature of 72½° plus the 3° from heater 42 will raise the effective temperature at thermostat 9 to 75½°, which will cause the mercury column to engage the upper contact 48 and complete a circuit around the relay 25 so that this relay will be de-energized and spring 39 will elevate the contact 36 to the position shown in the drawings. This will cause the valve 12 to be closed and, since the thermostat temperature is no longer increased by any heat from the coil 42, the mercury column will fall so as to break contact at 48 so that the relay 25 will again be energized and the operating circuit for the valve will again be completed to renew the flow of steam. At the same time the heater 42 will again be energized so as to again raise the mercury column. This cycle of events will repeat itself so as to cause steam to flow in spaced bursts or impulses into the heater 6. The closer the actual atmospheric temperature in the car at the level of thermostat 9 is to 72° the greater portion of the time the valve 12 will be open, whereas the closer this car temperature is to 75° the greater will be the proportion of the time that the valve is closed. In other words, when the temperature of the space is 72°, the thermostat 9 will cycle at a lower rate and thereby permit the steam valve 22 to remain open for longer periods of time than when the temperature of the space is at or slightly below the upper limit of 75°. The amount of heat added to the air stream is, therefore, varied in relation to the temperature of the space when the said space temperature is between 72 and 75°. When the temperature of the space rises above 75° no heat at all will be added to the circulating air stream since the temperature effecting the thermostat 9 will always be 75° or higher and the relay will be continuously de-energized.

At the right hand side of the lower half of Fig. 4 is shown diagrammatically the valve 13 for supplying steam to one of the floor heat radiators. As here shown, this valve is of the same type as the valve 12 previously described, the valve comprising a movable valve member 51 which is held closed by spring 52 unless the solenoid coil 19 is energized to pull in the core 53 and open the valve.

It is to be understood that either or both of the valves 13 and 12 could, if desired, be of the electrically closed and spring-opened type, it only being necessary to vary the electrical operating connections accordingly.

A relay coil 54 will, when energized, draw in the core 55 which, through stem 56, will pull down the contact plate 57 into engagement with a pair of fixed contacts 58 and 59, thus completing a valve-operating circuit as follows: From main 26, through wire 60, relay contacts 58, 57 and 59, wire 61, valve-operating coil 19, and wire 62 to the main 33. This will function to open the valve 13 and admit steam to the floor-radiation.

The thermostat 21 for controlling the floor-heat comprises a mercury column 63 which (for example) at or above a temperature of 71° will engage an upper fixed contact 64, thus completing a circuit between relay terminals 65 and 69, this partial circuit being as follows: from terminal 65 through wire 66, thermostat-contact 67, mercury column 63, thermostat-contact 64, and wire 68 to the terminal 69. This will short-circuit the relay coil 54 so that spring 70 will lift the contact plate 57 against the upper stops 71 and 72, thus breaking the valve-operating circuit and permitting spring 52 to close the valve 13. This is the position shown in the drawings.

At the bottom of Fig. 4 is indicated another thermostat 73 which is located outside of the car so as to be responsive to changes in the prevailing outside temperature. When this outside temperature is at or above 30° (for example) a circuit will be completed as follows: from the main 26 through wire 74, resistor 75, relay terminal 76, wire 77, thermostat 73, wire 78, relay terminal 79, wire 80 and resistor 81 to the other main 33. If the outside temperature falls below 30°, this circuit between terminals 76 and 79 will be broken and the current will now flow through the relay coil 82 so as to pull down the core 83 against the resistance of spring 84 and move the contact plate 85 down against the pair of fixed contacts 86 and 87. A circuit will now be completed as follows: from the main 26 through wire 88, relay contacts 86, 85 and 87, wire 89, resistor 90, wire 91, terminal 65, relay coil 54, terminal 69, wire 92, and resistor 93, and thence to the main 33. Since the coil 54 is now energized, the relay contacts 57, 58 and 59 will now be closed and the solenoid 19 will be energized to open the valve 13 and admit steam to the floor-radiator. Of course, this operation can only take place if the temperature within the lower portion of the car is below 71° so that the relay coil 54 is not short-circuited.

A manually operated fan-switch indicated at S is centrally pivoted at 94 and, when in the position shown in solid lines, a fan-motor circuit will be completed as follows: from main 26, through wire 95, switch arm 96, fixed contact 97, wire 98, fan-motor 99 and wire 100 to the other main 33. A shunt field for the motor is indicated at 101. It will be understood that the motor 99 drives the fan or blower 3, already indicated in Fig. 1. In the event that the switch S is moved to the dotted line position and the fan or blower is not operating, a circuit for energizing the relay 54 can flow as follows: from main 26, through wire 95, switch arm 102, fixed contact 103, wire 104, resistor 90 and wire 91 to the relay-coil 54 and thence as before to the other main 33.

It will thus be seen that relay 54 cannot operate to open the valve 13 unless (1) the temperature outside the car is below 30°, or (2) unless the fan switch F is moved to stop the operation of the fan. Under either or both of these conditions the floor-radiation is operable providing the temperature in the lower portion of the car falls below 71°, but only while this temperature remains below 71°. It will, therefore, be seen that the floor-heat is used as an auxiliary heating means and only under certain special conditions, the over-head heating and ventilating means always being operative as the main source of heat and ventilation, except when the car temperature at the five foot level rises above 75° when this "over-head" system serves only as a ventilating and cooling means.

The manner in which the two heating systems will cooperate will now be described, it being understood that above 75° both heating systems will be inoperative, although the overhead system will continue to serve as a ventilating means. As the temperature within the car adjacent the thermostat 9 (that is, at an approximately five foot level) falls from 75° to 72°, the heat added to the air stream flowing through duct 2 and then back through the body of the car will be gradually increased until at and below 72° this over-head heating system will be operating at full capacity. This capacity should be ordinarily ample to maintain a desired temperature of (for example) 72° within the body of the car. However, under certain conditions the temperature in the lower strata of air or adjacent the floor of the car may fall lower, and additional heat will be desirable at the lower levels. If this floor-heat temperature falls below 71° steam will be admitted to the floor heat radiation and these floor-radiators will be effective until the temperature at this level has been raised above 71°, whereupon the continued flow of steam to the radiators will be cut off. However, it should be understood that this floor heat radiation cannot be operated at all unless the outside air temperature falls below 30°, or the floor switch S is turned in a counter-clockwise direction to the dotted line position, that is the blower fan is not in operation. This heat from the floor radiation will not only raise the temperature of the air in the lower portion of the car but this heated air will rise so as to additionally heat the air at the five foot level and eventually cause the thermostat 9 to reduce the supply of heat in the air duct and lower the temperature of the air stream. Since 25% of this air stream is relatively cold fresh air, this over-head system may now operate not only as a ventilating system but as a cooling means to counteract to some extent the heat rising from the floor-heat system. When the temperature adjacent the floor rises above 71°, the flow of steam to the floor-heat radiation will be cut off and, as the rise of the heated air from this heating system ceases, the over-head system will again be operative at full capacity to maintain the temperature at 72° or higher in the upper portion of the car. The two heating systems will thus cooperate to maintain a substantially constant temperature level at the intermediate height within the car, and sufficient heat will be added, when necessary, by the floor-heat system to prevent the temperature falling at the floor level below an undesired minimum.

Up to this point we have described the cooperating thermostats 9 and 21 as functioning at certain predetermined temperatures, but these temperatures were selected merely to show the relative points at which these thermostats function. Manually operated means is provided for simultaneously adjusting or selecting the operating temperatures for both of the thermostats without changing the relative temperatures at which these thermostats operate. The rheostat R comprises an arm centrally pivoted at 106 and comprising a conductor 107 adapted to slidable contact at its left-hand end with the arcuate contact plate 108, and when moved to the "low" position shown in the drawings, contacting at its upper right hand end with a fixed contact 109. When this rheostat arm is swung in a clockwise direction to the "medium" or "high" positions, the right-hand end of the conductor 107 will successively engage with the fixed contacts 110 and 111. When the rheostat arm is moved to the "low" position shown in the drawings, a heating current will flow as follows: from main 26 through wire 112, contact plate 108, rheostat conductor 107, contact 109, wire 113, resistance 114, wires 115 and 116 to and through the heating coil 42 and thence through wire 117 to the other main 33. Through the circuit just described, the coil 42 will be continuously heated so that the thermostat 9 will function at an actual atmospheric temperature (for example 75°) somewhat lower than the temperature for which the thermostat (without the heating coil) was designed. It will be understood that when this thermostat "cycles," in the manner hereinabove described, another parallel branch of the heating circuit will be provided through the lower relay contacts and the resistor 45, as previously described. Consequently a stronger current will flow at this time through the heating coil 42 so that the thermostat 9 will function at a lower temperature for example 72°.

If the rheostat arm is adjusted in a clockwise direction to the "medium" position, with conductor 107 in engagement with contact 110, or to the opposite extreme position or "high" heat, with the arm 107 in engagement with contact 111, similar controlling circuits will be completed including either the resistors 118 or 119, respectively, instead of the first described resistor 114. These three resistors 114, 118 and 119 are of different values so that the resulting heating current in coil 42 will be of a comparatively low, medium or high temperature and the functioning temperature of the thermostat 9 will be varied accordingly. In each case, the "cycling" heat will simply be added to the heat selected by the rheostat.

It will now be noted that the movable arm of the rheostat carries a second conductor 120 (insulated from the conductor 107), this conductor engaging at one end the arcuate contact plate 121 and at the other end engaging a selected one of the three contacts 122, 123 and 124 which selectively completes circuits from the main 26, through wire 112, the selected one of the three resistances 125, 126 or 127, wire 128, heating coil 129, and wire 130 to the other main 33. The three resistances 125, 126 and 127 are so selected as to influence the heating circuit for coil 129 (positioned on thermostat 21 similarly to the coil 42 on thermostat 9) and raise the functioning temperature of thermostat 21 to "low," "medium" or "high," accordingly. It will thus be seen that by the single adjustment of the rheostat R, a similar adustment of the functioning temperature will be imparted to each of the thermostats 9 and 21. That is, if thermostat 9 functions at 72°, the thermostat 21 will function at 71°, but if thermostat 9 is set to function at 74°, the thermostat 21 will be set for 73°. The difference between the functioning temperatures of the two thermostats will remain constant at all times.

If desired, a "cycling" control of the lower thermostat 21 could be provided similar to that now shown on thermostat 9, but in the normal operation of the system as previously described this cycling control will not ordinarily be necessary.

We claim:

1. In a heating and ventilating system, means for circulating an air stream through an enclosure comprising an over-head duct, a blower for forcing an air-stream into and through the duct, said stream consisting of a larger portion withdrawn from the enclosure and a smaller portion of fresh outside air, means in the duct for adding heat to the air stream, a thermostat positioned in the enclosure at a height substantially midway between the top and bottom thereof and in the path of the air flow outside the duct, said thermostat controlling the heating means in the duct so as to maintain a predetermined temperature in the enclosure at the location of the thermostat, radiating means for adding heat to the air in the enclosure adjacent the floor-level, means including a thermostat adjacent the floor-level for admitting heating medium to the radiating means when the temperature adjacent this lower thermostat falls below a predetermined minimum, and thermostatic means located outside the enclosure and rendering the floor-heat means inoperative while the outside temperature is above a predetermined minimum.

2. In a heating and ventilating system, means for circulating an air stream through an enclosure comprising an over-head duct, a blower for forcing an air-stream into and through the duct, said stream consisting of a larger portion withdrawn from the enclosure and a smaller portion of fresh outside air, means in the duct for adding heat to the air stream, a thermostat positioned in the enclosure at a height substantially midway between the top and bottom thereof and in the path of the air flow outside the duct, said thermostat controlling the heating means in the duct so as to maintain a predetermined temperature in the enclosure at the location of the thermostat, radiating means for adding heat to the air in the enclosure adjacent the floor-level, means including a thermostat adjacent the floor-level for admitting heating medium to the radiating means when the temperature at this lower thermostat falls below a predetermined minimum, thermostatic means located outside the enclosure and rendering the floor-heat means inoperative while the outside temperature is above a predetermined minimum, and means rendering the floor-heat means inoperative as long as the blower is operating, unless the outside temperature falls below the predetermined minimum.

TIMOTHY J. LEHANE.
EVERETT H. BURGESS.